US006386741B1

(12) United States Patent
Jones et al.

(10) Patent No.: US 6,386,741 B1
(45) Date of Patent: May 14, 2002

(54) METHOD AND APPARATUS FOR SUPPLYING POWER TO AN ELECTRICAL OR ELECTRONIC DEVICE IN CONJUNCTION WITH A VANITY MIRROR

(75) Inventors: Barrie M. Jones; Mark A. Kimmet, both of Knoxville, TN (US)

(73) Assignee: Polymore Circuit Technologies, L.P., Maryville, TN (US)

( * ) Notice: Subject to any disclaimer, the term of this patent is extended or adjusted under 35 U.S.C. 154(b) by 0 days.

(21) Appl. No.: 09/306,250

(22) Filed: May 6, 1999

(51) Int. Cl.[7] ............................ B60Q 3/02; F21V 23/00

(52) U.S. Cl. ....................... 362/492; 362/135; 174/257; 174/258

(58) Field of Search ................................ 174/250–268; 362/492, 135, 394

(56) References Cited

U.S. PATENT DOCUMENTS 3,909,680 A * 9/1975 Tsunashima ................ 174/257
4,081,601 A * 3/1978 Dinella et al. .............. 174/257
4,130,723 A * 12/1978 Wakeling ..................... 174/36
4,628,187 A 12/1986 Sekiguchi, et al. ......... 219/505
4,809,140 A * 2/1989 Jonsas ........................ 362/492
4,857,711 A 8/1989 Watts ......................... 219/548
4,931,627 A 6/1990 Watts ......................... 219/548
5,019,944 A * 5/1991 Ishii et al. .................. 174/259
5,162,950 A 11/1992 Suman, et al ............... 359/871
5,181,006 A 1/1993 Shafe, et al. .............. 338/22 R
5,205,635 A * 4/1993 Van Order et al. ......... 362/492
5,406,049 A 4/1995 Reiser, et al. ............... 219/219
5,440,425 A 8/1995 Kadooka, et al. ........... 359/512
5,517,003 A 5/1996 Kadooka, et al. ........... 219/548
5,599,087 A * 2/1997 Kanno et al. ............... 362/505
5,990,449 A 11/1999 Sugiyama, et al. ......... 219/219

* cited by examiner

*Primary Examiner*—Alan Cariaso
(74) *Attorney, Agent, or Firm*—Pitts & Brittian, P.C.

(57) ABSTRACT

An apparatus for supplying power to and for holding an electrical or electronic device. The apparatus generally comprises a glass substrate having at least a surface. The apparatus of the present invention also includes a conductive strip applied to the surface of the glass substrate and a second strip applied to the surface of the glass substrate wherein the second strip covers at least a portion of the conductive strip and wherein the second strip is selected from the group consisting of a conductive strip, a resistive strip, and an insulating strip. The apparatus of the present invention further includes device connective means for connecting the electrical or electronic device to the apparatus and power connective means. The device connective means is in direct contact with at least a portion of the conductive strip and receives power for the electrical or electronic device from the power connective means through the conductive strip. A method for producing such an apparatus is also provided.

12 Claims, 4 Drawing Sheets

METHOD AND APPARATUS FOR SUPPLYING POWER TO AN ELECTRICAL OR ELECTRONIC DEVICE IN CONJUNCTION WITH A VANITY MIRROR

FIELD OF THE INVENTION

The present invention relates to methods and apparatus for supplying power to electrical or electronic devices. More particularly, the present invention relates to those methods and apparatus that use the electrical or electronic devices in conjunction with a glass or similar substrate.

BACKGROUND OF THE INVENTION

It is often quite useful to be able to place electrical or electronic devices on or very close to the surface of a glass substrate. Without meaning to limit the scope of the present invention, typical examples of such uses are with respect to the mounting of lights in the vicinity of vanity mirrors for use in automobile visors or placing a heating element on the surface of a glass.

A discussion of the illuminated vanity mirror for use in the visor of an automobile provides an illustration of the usefulness and problems associated with the placement of electrical or electronic devices on or very close to the surface of a glass substrate. Similar problems exist with most of the situations where it is desirable to mount an electrical or electronic device on or near the surface of a glass substrate.

Vanity mirrors which mount to sun visors have long been a popular accessory in passenger automobiles. Typically, the mirror is mounted on the upper surface of the sun visor, so that when the sun visor is swung downwardly to a sun shading position, the mirror is aligned with the face of the driver or passenger for uses such as personal grooming and the like. Certain of such vanity mirrors have been provided in packages with electric lighting which illuminates the users face for night time operation or to approximate ambient light conditions to be encountered by the user at his or her destination. One known type of lighted vanity mirror includes a pair of electric lamps disposed at opposite ends of the mirror and a pivotable cover for covering the mirror and lights when not in use. Circuitry for connection of the lights to the automobile's electrical system, including an on/off switch and often times a dimming control, is also provided in the module.

It has been found that such lighted vanity mirror modules can be improved upon in a number of respects. One potential area of improvement lies in the packaging of the electrical circuitry employed in the module. Traditionally, most illuminated vanity mirror modules comprise a shallow housing covered by an appearance bezel which usually supports the mirror, lid, and lenses for the electric lamps and the mirror. The electrical circuitry consisting of an on/off switch in some cases a dimming control, a pair of bulbs, and electrical conductors comprising metallic stampings or wires including the bulbs, switch and dimmer, are disposed in the housing beneath the bezel. Where the circuit conductors comprise metallic stampings, such stampings are often heat staked to, or molded within a base plate of the housing.

Such constructions are disadvantageous in a number of respects. For example, the housing and bezel tend to be heavy and bulky, thereby adding significantly to the weight and bulk of the visor on which they are attached. This renders the visor cumbersome to operate and dimensionally, quite thick thereby reducing passenger head room in the automobile. Molding the metallic stampings into the housing base plate when the base plate, adds significantly to the cost of molding the housing and risks unacceptable warpage of the base plate during manufacture.

In an effort to reduce the bulk and weight of the lighted mirror module, it is sometimes the practice to mount the electrical circuit components directly to a molded sun visor blade. While this construction eliminates the need for a housing and base plate, it limits the type of visors to which the module is adaptable and, therefore, may not be useful with the padded and upholstered visors found in current luxury automobiles. Moreover, if the lighted mirror module requires service, the entire visor must be serviced since that the module is an integral part of the visor and is not conveniently removable therefrom for servicing.

Another area of improvement in current lighted vanity mirror modules lies in the construction of the dimming control. Certain mirror modules employ resistors connected along the length thereof to a plurality of contacts formed into a metallic stamping and a movable wiper contact which rides along the contacts to adjust the amount of resistance in the lamp circuit and thus control the lamp intensity. Such a construction is found in U.S. patent application Ser. No. 07/357,652. While such a construction has proven to be effective and reliable, the metallic stamping employed into which the resistor contacts are employed, is rather complex in shape, somewhat costly, and therefore not as economical as may be desired. Other lighted mirror modules such as that disclosed in U.S. Pat. No. 4,879,637 employ specialized resistors comprising resistive coatings on a circuit board. However, such resistors can be prohibitively expensive and may require multiple contacts similar to those discussed hereinabove and, therefore, are also characterized by some significant cost and complexity.

As is shown for lighted vanity mirrors, it is highly desirable to provide an apparatus for mounting an electric or electronic device on or near the surface of a glass substrate that is similarly characterized by compactness, simplicity of construction and economy of manufacture.

Therefore, it is an object of the present invention to provide an apparatus that will allow the mounting of an electrical or electronic device on or near the surface of a glass substrate.

It is a further object of the present invention to provide such an apparatus that is compact in construction.

It is an additional object of the present invention to provide such an apparatus that is simple to construct.

It is yet another object of the present invention to provide such an apparatus that is relatively inexpensive to manufacture.

Consideration of the specification, including the several figures to follow, will enable one skilled in the art to determine additional objects and advantages of the invention.

SUMMARY OF THE INVENTION

Having regard to the above and other objects and advantages, the present invention generally provides for an apparatus for supplying power to and for holding an electrical or electronic device. The apparatus generally comprises a glass substrate having at least a surface. The apparatus of the present invention also includes a conductive strip applied to the surface of the glass substrate. The apparatus of the present invention further includes power connective means in direct contact with the conductive strip.

In a preferred embodiment of the present invention, the conductive strip includes a material selected from the group consisting of copper and silver. Further preferred embodiments of the invention provide that the power connective means is attached to at least a portion of the conductive strip by use of a solder connection or a conductive adhesive.

The present invention also provides for an apparatus for supplying power to and for holding an electrical or electronic device. The apparatus generally comprises a glass substrate having at least a surface. The apparatus of the present invention also includes a conductive strip applied to the surface of the glass substrate and a second strip applied to the surface of the glass substrate wherein the second strip covers at least a portion of the conductive strip. The second strip may be a strip selected from the group consisting of a conductive strip, a resistive strip, or an insulating strip. The apparatus of the present invention further includes device connective means for connecting the electrical or electronic device to the apparatus and power connective means. The device connective means is in direct contact with at least a portion of the conductive strip and receives power for the electrical or electronic device from the power connective means through the conductive strip.

In a preferred embodiment of the present invention, the conductive strip includes a material selected from the group consisting of copper and silver. In a further preferred embodiment of the present invention, the second strip includes carbon when the second strip is a resistive strip.

In other preferred embodiments of the present invention, the device connective means is attached to at least a portion of the conductive strip by use of a solder connection or a conductive adhesive. Further preferred embodiments of the invention provide that the power connective means is attached to at least a portion of the conductive strip by use of a solder connection or a conductive adhesive.

Another preferred embodiment of the present invention provides that the glass substrate is a mirror having an unmirrored surface and a mirrored surface, the conductive strip is applied to the unmirrored surface of the glass substrate, and the second strip is applied to the unmirrored surface of the glass substrate. In the present discussion, the unmirrored surface of a glass substrate is that surface to which no mirroring has been applied and the mirrored surface is that surface to which mirroring or silvering has been applied. In a more preferred embodiment of the present invention, the electrical or electronic device is at least one light source and the apparatus is suitable for use as a lighter vanity mirror in an automobile.

In yet another preferred embodiment of the present invention, the glass substrate is substantially planar and has a first surface and a second surface, the conductive strip is applied to the first surface of the glass substrate, and the second strip is applied to the first surface of the glass substrate. It is even more preferred that the electrical or electronic device is at least one heat source and the apparatus is suitable for use as a glass heater.

The present invention also provides a method for producing an apparatus for supplying power to and for holding an electrical or electronic device. The method comprises the steps of preparing a glass substrate having at least a surface and then applying a conductive strip to the surface of the glass substrate. Next, a power connective means is placed in direct contact with at least a portion of the conductive strip, such that the power connective means connects electrical power to the electrical or electronic device through the conductive strip.

In a preferred embodiment of the present invention, the conductive strip applied to the surface of the glass substrate is polymer thick film ink. Generally, polymer thick film inks are printable resins which include conductive fillers (for a conductive polymer thick film ink), resistive filler (for a resistive polymer thick film ink), or no fillers (for an insulating polymer thick film ink). In further preferred embodiments of the present invention, the conductive strip includes a material selected from the group consisting of copper and silver.

The present invention also provides a method for producing an apparatus for supplying power to and for holding an electrical or electronic device. The method comprises the steps of preparing a glass substrate having at least a surface and then applying a conductive strip to the surface of the glass substrate followed by applying a second strip to the surface of the glass substrate wherein the second strip covers at least a portion of the conductive strip and wherein the second strip is selected from the group consisting of a conductive strip, a resistive strip, and an insulating strip. Next, a device connective means is placed in direct contact with at least a portion of the conductive strip, such that the device connective means connects the electrical or electronic device to the apparatus. Finally, a power connective means is placed in direct contact with at least a portion of the conductive strip, such that the power connective means connects electrical power to the electrical or electronic device through the conductive strip.

In a preferred embodiment of the present invention, the conductive and the second strips applied to the surface of the glass substrate are polymer thick film inks. In further preferred embodiments of the present invention, the conductive strip includes a material selected from the group consisting of copper and silver and the second strip includes carbon when the second strip is a resistive strip.

Another preferred embodiment of the present invention provides that the device connective means is attached to at least a portion of the conductive strip by the use of a solder connection or a conductive adhesive.

The present invention also provides for a method for producing an apparatus for supplying power to and for holding an electrical or electronic device. The method comprising the steps of first preparing a glass substrate having at least a surface followed by masking a portion of the glass substrate. Then a conductive polymer thick film ink is applied to the masked glass substrate. The mask is then removed and the conductive polymer thick film ink is cured to produce a conductive strip on the surface of the glass substrate. The next steps in the method are masking another portion of the glass substrate and applying a second polymer thick film ink to the masked glass substrate, wherein the second polymer thick film ink is selected from the group consisting of a conductive polymer thick film ink, a resistive polymer thick film ink, and an insulating polymer thick film ink. Again, the mask is removed and the second polymer thick film ink is cured to produce a second strip to the surface of the glass substrate, wherein the second strip is selected from the group consisting of a conductive strip, a resistive strip, and an insulating strip. The resulting second strip covers at least a portion of the conductive strip. Next, a device connective means is placed in direct contact with at least a portion of the conductive strip, such that the device connective means connects the electrical or electronic device to the apparatus. Finally, a power connective means is placed in direct contact with at least a portion of the conductive strip, such that the power connective means connects electrical power to the electrical or electronic device through the conductive strip.

In a preferred embodiment of the present invention, the conductive polymer thick film ink includes a material selected from the group consisting of copper and silver. In another preferred embodiment of the present invention, the second polymer thick film ink includes carbon when the second polymer thick film ink is a resistive polymer thick film ink.

BRIEF DESCRIPTION OF THE DRAWINGS

The above and other features and advantages of the invention will become further known from the following detailed description of preferred embodiments of the invention in conjunction with the drawings in which.

DETAILED DESCRIPTION OF THE DRAWINGS

Figure 1:
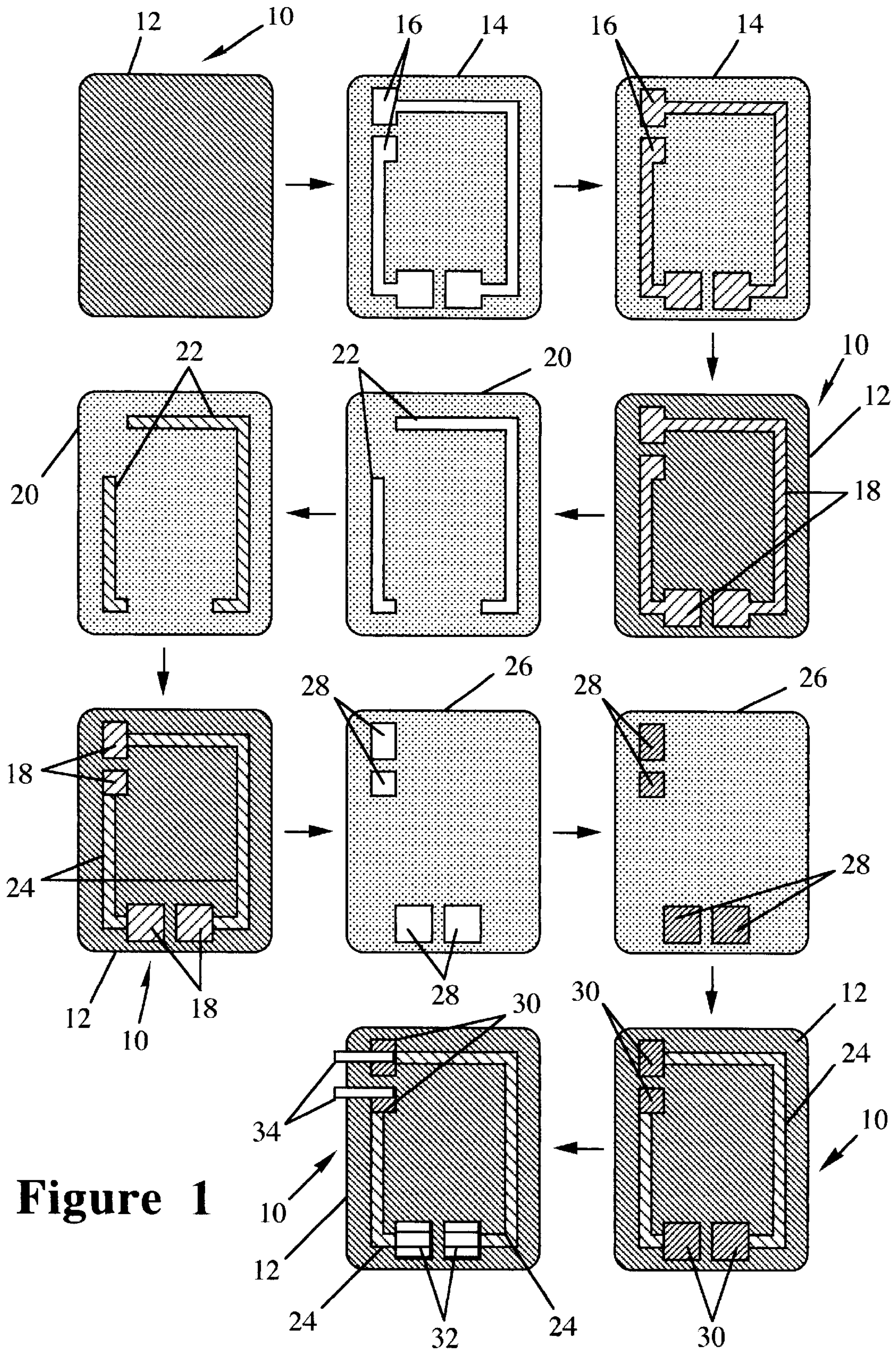
FIG. 1 is a drawing of a first preferred process for producing an apparatus according to the present invention.

Referring now to the drawings in which like reference characters designate like or corresponding parts throughout the several views, FIG. 1 shows a drawing of a first preferred process for producing an apparatus according to the present invention. A glass plate 10 is prepared by cleaning the top surface 12 of the plate 10. A first mask 14 is prepared with the design 16 of the desired conductive strip to be placed on the plate 10.

The mask 14 is placed on the top surface 12 of the plate 10 and a conductive polymer thick film ink is applied to the mask 14 and the top surface 12 of the plate 10. The mask 14 is removed and the strip 18 of the conductive polymer thick film ink is cured by heat, treatment with infrared, or by any one of a number of ways known by persons having ordinary skill in the art to cure polymer thick film inks. The choice of the proper conductive polymer thick film ink is made on the basis of use of the apparatus. For applications requiring an interconnection resistivity of less than about 200 milliohm per square, an ink using copper will be preferred. For applications requiring an interconnection resistivity of less than about 70 milliohm per square, an ink using silver will be preferred. For the purposes of FIG. 1, it will be assumed that the conductive polymer thick film ink uses copper.

Upon the curing of the conductive strip 18, a second mask 20 is prepared with a design 22 of the desired second strip to be placed on the plate 10. The second strip may be either another conductive strip, a resistive strip, or an insulating strip. The following description will use a resistive strip solely for the purposes of illustration. The mask 20 is then placed on the top surface of the plate 10 and a resistive polymer thick film ink is applied to the mask 20 and the top surface 12 of the plate 10. The mask 20 is then removed and the strip 24 of the resistive polymer thick film ink is cured. Usually, at least a portion of the resistive strip 24 covers at least a portion of the conductive strip 18. In this way, the resistive strip 24 protects the conductive strip while leaving other portions of the conductive strip 18 uncovered for connections to power or the desired electrical or electronic device. Also, portions of the resistive strip 24 may act as resistors or as portions of potentiometers during the use of the apparatus.

Upon the curing of the resistive strip 24, a third mask 26 is prepared with a design 28 of the desired positions of solder on the top surface 12 of the glass plate 10. Generally, the positions of the solder are those portions of the conductive strip 18 that were not covered by the resistive strip 24. The mask is then placed over the top surface 12 of the glass plate 10 and a solder paste is applied onto the mask 26 and the top surface 12 of the plate 10. The mask 26 is then removed from the top surface 12 of the glass plate 10 leaving a solder paste strip 30. The holders 32 for the desired electrical or electronic device are placed in conjunction with the solder paste strip 30, the solder is reflowed, and the holders 32 become attached to the apparatus. Other connectors 34 to provide power and/or data lines for the electrical or electronic device also become attached to the solder paste strip 30 at the desired locations.

The other connectors 34 are shown in FIG. 1 as connectors allowing clips to be attached to the connectors 34. However, this is only one way of connecting power and/or data to the apparatus. The other connectors 34 alternatively may be wires soldered to the solder paste strip 30 or may be mechanical, push on connections designed into a bracket holding the apparatus. These types of arrangements may be used in any of the following illustrated apparatus.

The resulting apparatus is compact, simple of design, and economical to manufacture.

Figure 2:
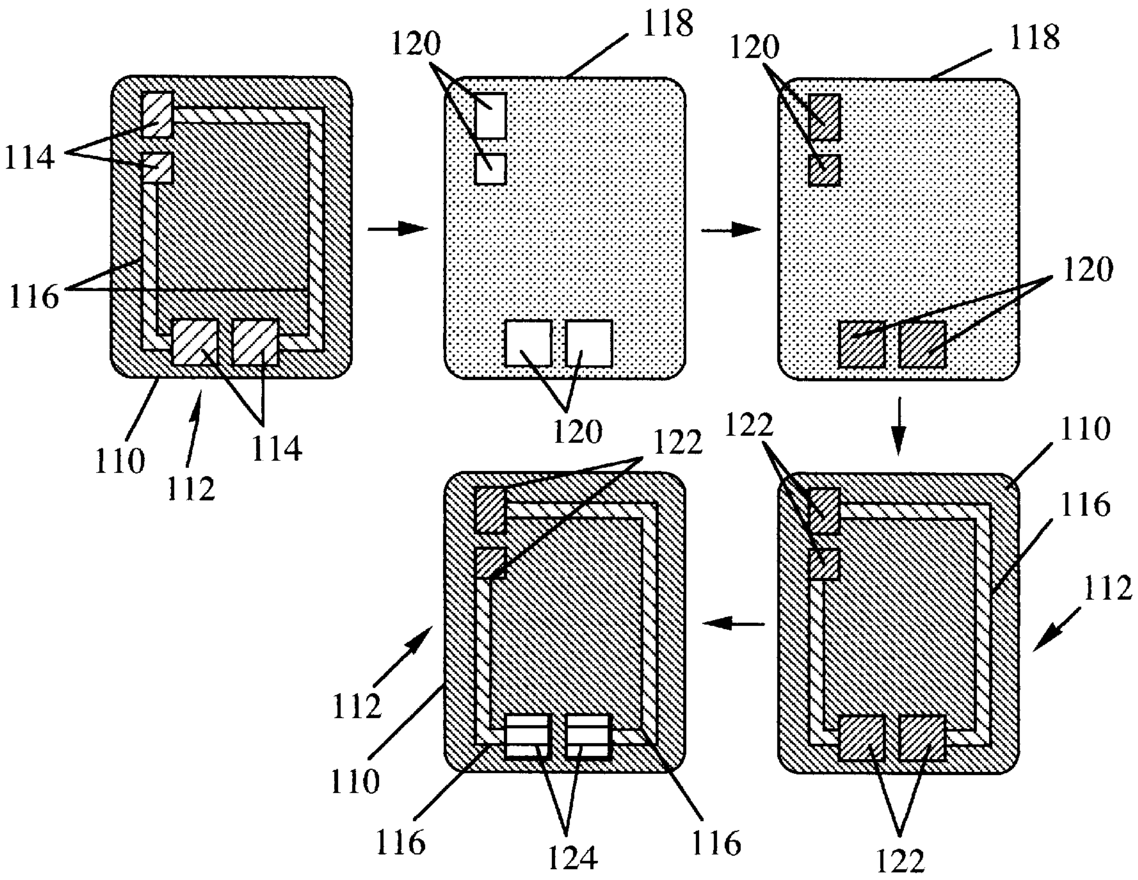
FIG. 2 is a drawing of a second preferred process for producing an apparatus according to the present invention.
Figure 3:
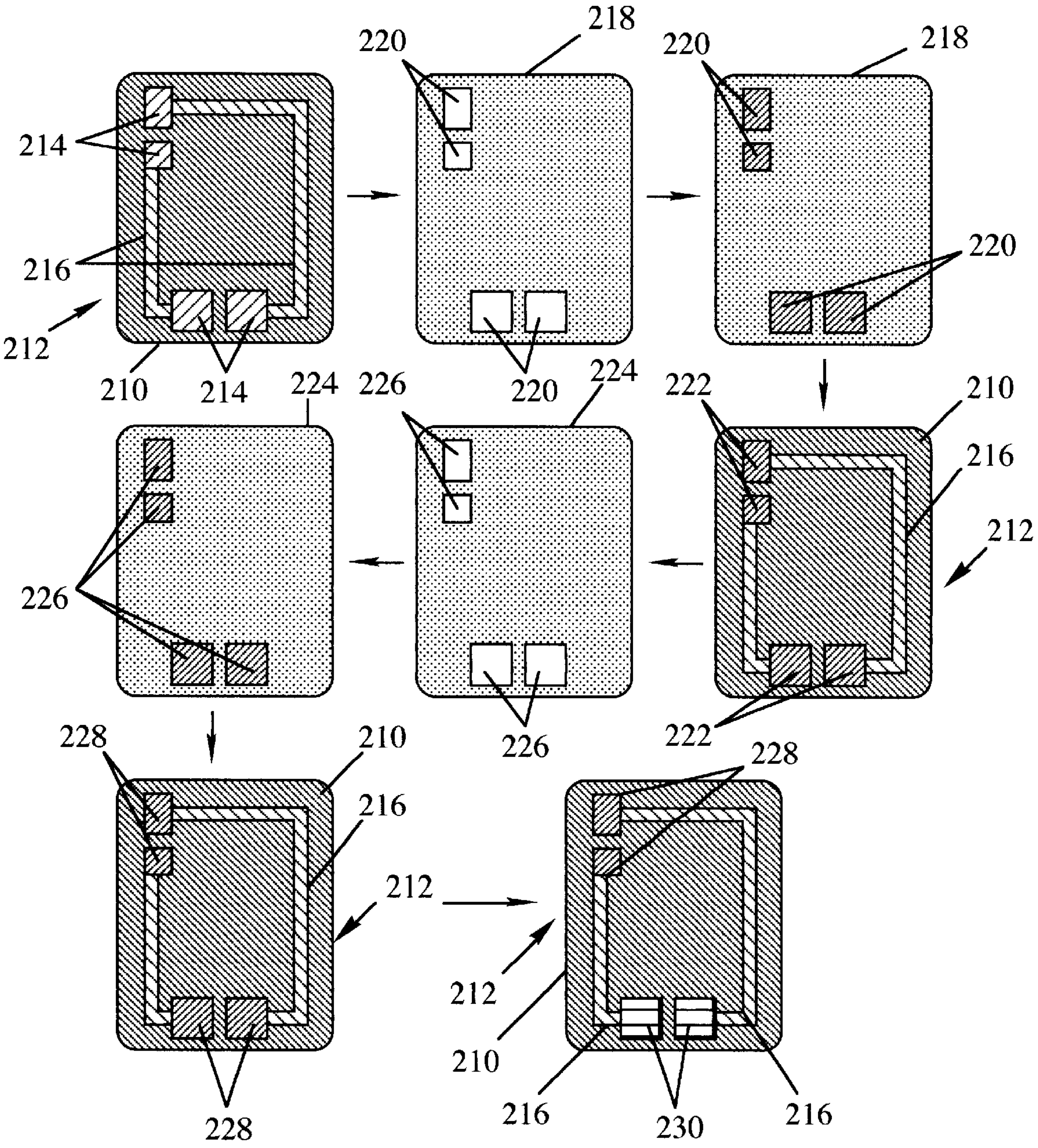
FIG. 3 is a drawing of a third preferred process for producing an apparatus according to the present invention.

For those apparatus which use silver in the conductive polymer thick film ink, a slightly different process is involved which is shown in FIGS. 2 and 3. In FIG. 2, the top surface 110 of a glass plate 112 has been printed with a silver conductive strip 114 and a resistive strip 116. Again, a mask 118 is prepared with a design 120 of the desired positions of a conductive adhesive on the top surface 110 of the glass plate 112. The mask 118 is placed over the top surface 110 of the glass plate 112 and a conductive adhesive is applied onto the mask 118 and the top surface 110 of the glass plate 112. The mask 118 is removed and a conductive adhesive strip 122 is present on the top surface 110 of the glass plate 112. Holders 124 for the desired electrical or electronic device are placed in conjunction with the conductive adhesive strip 122, the conductive adhesive is cured, and the holders 124 become attached to the apparatus. This process is required where silver conductive strips 114 are used since solder will not adhere to polymer thick film silver.

FIG. 3 shows yet another way to produce the desired apparatus according to the present invention when soldered connections are required. The top surface 210 of a glass plate 212 has been printed with a silver conductive strip 214 and a resistive strip 216. A mask 218 is prepared with a design 220 of the desired positions of copper on the exposed silver on the top surface 210 of the glass plate 212. The mask 218 is placed over the top surface 210 of the glass plate 212 and a solderable conductive polymer thick film ink including copper is applied onto the mask 218 and the top surface 210 of the glass plate 212. The mask 218 is removed and a copper conductive strip 222 is present on the top surface 210 of the glass plate 212. Another mask 224 is prepared with a design 226 of the desired positions of solder on the copper conductive strip 222 on the top surface 210 of the glass plate 212. The mask 224 is placed over the top surface 210 of the glass plate 212 and a solder paste is applied onto the mask 224 and the top surface 210 of the glass plate 212. The mask 224 is removed and a solder strip 228 is present on the top surface 210 of the glass plate 212. Holders 230 for the desired electrical or electronic device are placed in conjunction with the solder strip 228, the solder is reflowed, and the holders 230 become attached to the apparatus.

Figure 4:
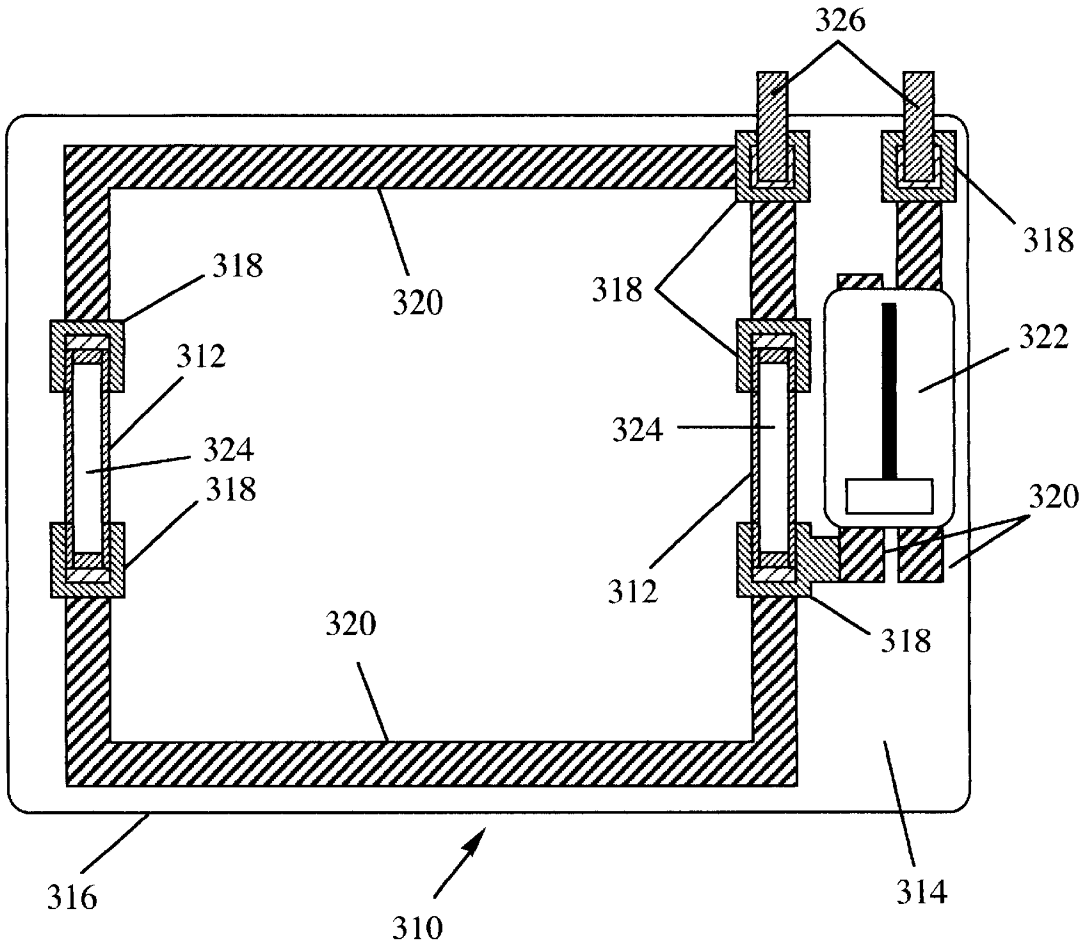
FIG. 4 is a drawing of an apparatus according to the present invention and assembled to be used as a component of a lighted visor mirror for use in an automobile.

FIG. 4 shows a drawing of an apparatus 310 assembled according to the present invention. The illustrated apparatus

310 is prepared for use with a lighted visor mirror having an adjustable mechanism for controlling the brightness of the light. Holders 312 are attached to the unmirrored surface 314 of a glass mirror 316. The surface 314 has a conductive strip 318 and a resistive strip 320 printed on in accordance with the process shown in FIG. 1 hereinabove. A dimmer control 322 may be located atop a section of the resistive strip 320. Light bulbs 324 are placed in the holders 312 and power is applied to the apparatus 310 through the leads 326 attached to the conductive strip 318.

As can be seen, the apparatus 310 is compact and hardy. Since it functions as an integrated unit there is a minimum of problem with flexing or other problems associated with systems where the components are not assembled in such a manner.

Thus, the present invention provides an apparatus that will allow the mounting of an electrical or electronic device on or near the surface of a glass substrate. In addition, the present invention provides such an apparatus that is compact in construction. Further, the present invention provides such an apparatus that is simple to construct. Also, the present invention provides such an apparatus that is relatively inexpensive to manufacture.

Having thus described various preferred embodiments of the invention and several of its benefits and advantages, it will be understood by those of ordinary skill that the foregoing description is merely for the purpose of illustration and that numerous substitutions, rearrangements and modifications may be made in the invention without departing from the scope and spirit of the appended claims.

The appended claims set forth various novel and useful features of the invention.

What is claimed is:

1. An apparatus for supplying power to and for holding an electrical or electronic device, the apparatus comprising:

a) a glass substrate having at least a surface;

b) a conductive strip applied to the surface of the glass substrate;

c) a second strip applied to the surface of the glass substrate wherein the second strip covers at least a portion of the conductive strip and wherein the second strip is a resistive strip, said second strip includes carbon;

d) device connective means for connecting the electrical or electronic device to the apparatus, wherein the device connective means is in direct contact with at least a portion of the conductive strip; and e) power connective means for connecting electrical power to the electrical or electronic device through the conductive strip.

2. The apparatus of claim 1 wherein the conductive strip includes a material selected from the group consisting of copper and silver.

3. The apparatus of claim 1 wherein the device connective means is attached to at least a portion of the conductive strip by use of a solder connection.

4. The apparatus of claim 1 wherein the device connective means is attached to at least a portion of the conductive strip by use of a conductive adhesive.

5. The apparatus of claim 1 wherein the power connective means is attached to at least a portion of the conductive strip by use of a solder connection.

6. The apparatus of claim 1 wherein the power connective means is attached to at least a portion of the conductive strip by use of a conductive adhesive.

7. The apparatus of claim 1 wherein:

a) the glass substrate is a mirror having an unmirrored surface and a mirrored surface;

b) the conductive strip is applied to the unmirrored surface of the glass substrate; and c) the second strip is a resistive strip and is applied to the unmirrored surface of the glass substrate.

8. The apparatus of claim 7 wherein the electrical or electronic device is at least one light source and the apparatus is suitable for use as a lighted vanity mirror in an automobile.

9. The apparatus of claim 1 wherein:

a) the glass substrate is substantially planar and has a first surface and a second surface;

b) the conductive strip is applied to the first surface of the glass substrate; and c) the second strip is a resistive strip and is applied to the first surface of the glass substrate.

10. An apparatus for supplying power to and for holding an electrical or electronic device, the apparatus comprising:

a) a mirror defined by a glass substrate having an unmirrored surface and a mirrored surface;

b) a conductive strip applied to said unmirrored surface of said mirror;

c) a second strip applied to said unmirrored surface of said mirror, said second strip covering at least a portion of said conductive strip, said second strip being a resistive strip;

d) device connective means for connecting the electrical or electronic device to said apparatus, said device connective means being in direct contact with at least a portion of said conductive strip; and e) power connective means for connecting electrical power to the electrical or electronic device through said conductive strip.

11. The apparatus of claim 10 wherein the electrical or electronic device is at least one light source and wherein said apparatus is suitable for use as a lighted vanity mirror in an automobile.

12. An apparatus for supplying power to and for holding an electrical or electronic device, the apparatus comprising:

a) a glass substrate defining a substantially planar configuration and having a first surface and a second surface;

b) a conductive strip applied to said first surface of said glass substrate;

c) a second strip applied to said first surface of said glass substrate, said second strip covering at least a portion of said conductive strip, said second strip being a resistive strip;

d) device connective means for connecting the electrical or electronic device to said apparatus, wherein said device connective means is in direct contact with at least a portion of said conductive strip; and e) power connective means for connecting electrical power to the electrical or electronic device through said conductive strip.

* * * * *